United States Patent [19]
Jensen

[11] Patent Number: 6,122,824
[45] Date of Patent: Sep. 26, 2000

[54] METHOD FOR MANUFACTURING FLUID COMPRESSION/COMPRESSOR ROTOR

[76] Inventor: David L. Jensen, 901 Pine Trail, Rochester Hills, Mich. 48307

[21] Appl. No.: 09/382,912

[22] Filed: Aug. 25, 1999

Related U.S. Application Data

[60] Continuation-in-part of application No. 09/074,976, May 8, 1998, abandoned, which is a division of application No. 08/738,087, Oct. 25, 1996, Pat. No. 5,782,624.
[60] Provisional application No. 60/007,153, Nov. 1, 1995.

[51] Int. Cl.$^7$ ................................. F01C 1/08; B23C 3/18
[52] U.S. Cl. ............................... 29/888.023; 29/888.02; 409/132
[58] Field of Search .................................... 408/131, 132; 29/558, 888.02, 888.023, 888.025, 889.2

[56] References Cited

U.S. PATENT DOCUMENTS

| 1,907,897 | 5/1933 | Swegles | 29/893.34 |
|---|---|---|---|
| 2,279,414 | 4/1942 | Scott | 74/458 |
| 3,133,695 | 5/1964 | Zimmern | 428/35.8 |
| 3,632,239 | 1/1972 | Zimmern | 418/150 |
| 3,932,077 | 1/1976 | Zimmern | 418/195 |
| 3,945,778 | 3/1976 | Zimmern | 418/195 |
| 3,998,127 | 12/1976 | Romeu | 409/224 |
| 4,036,567 | 7/1977 | Sato | 418/105 |
| 4,179,250 | 12/1979 | Patel | 418/195 |
| 4,260,304 | 4/1981 | Jacobi | 409/132 |
| 4,533,286 | 8/1985 | Kishi et al. | 409/131 |
| 4,565,474 | 1/1986 | Charles . | |
| 4,596,501 | 6/1986 | Wu . | |
| 4,610,581 | 9/1986 | Heinlein | 409/132 |
| 4,664,570 | 5/1987 | Tsukiji et al. | 409/132 |
| 4,710,076 | 12/1987 | Boblitt | 409/26 |
| 4,775,270 | 10/1988 | Katayama et al. | 409/132 |
| 4,850,761 | 7/1989 | Breuer et al. | 409/132 |
| 5,129,800 | 7/1992 | Boblitt | 418/112 |
| 5,564,185 | 10/1996 | Saeki et al. | 29/888.02 |
| 5,647,703 | 7/1997 | Horiuchi | 409/48 |
| 5,779,406 | 7/1998 | Astor | 409/132 |

FOREIGN PATENT DOCUMENTS 495631  6/1954  Italy ........................................ 29/558

Primary Examiner—William Briggs
Assistant Examiner—Erica Ergenbright
Attorney, Agent, or Firm—Reising, Ethington, Barnes, Kisselle, Learman & McCulloch, P.C.

[57] ABSTRACT

Fluid compressor or expander having a main rotor with discrete arched-helical flutes that have ruled surface roots that match the predominantly planar tips of the teeth of the associated gate rotors and provide effective fluid sealing as the gate rotor teeth sweep through the flutes of the main rotor during compressor or expander operation. The flutes can be readily and economically made by end milling, in which a first flute is milled with a minimized number of milling passes such as a first pass to make one arched-helical flank and a portion of the arcked-helical root of a first flute and a second pass to make the opposing arcked-helical flank and another portion of the arched-helical root of the first flute. Additional discrete flutes are made in a similar manner until the main rotor is completed.

8 Claims, 9 Drawing Sheets

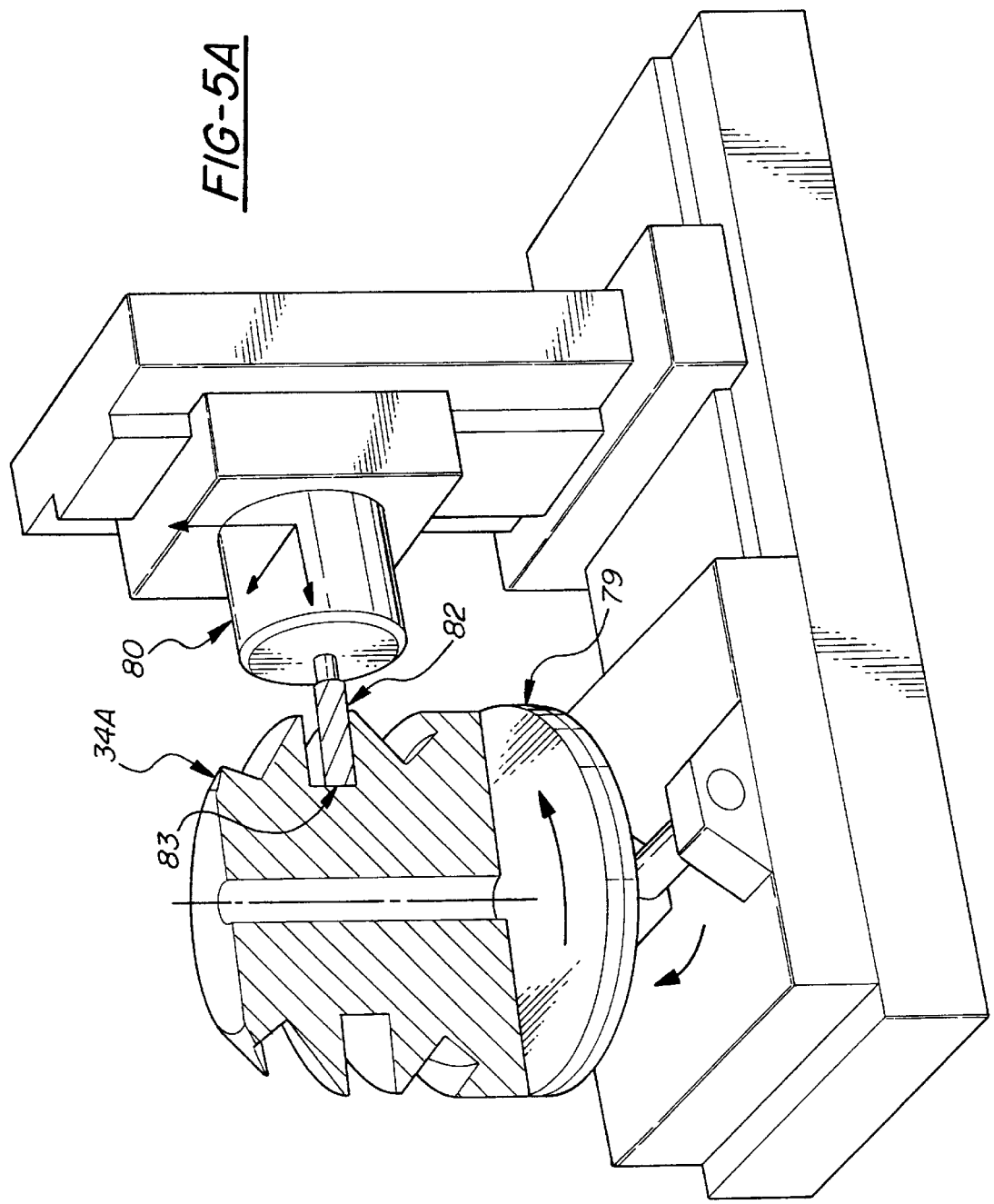

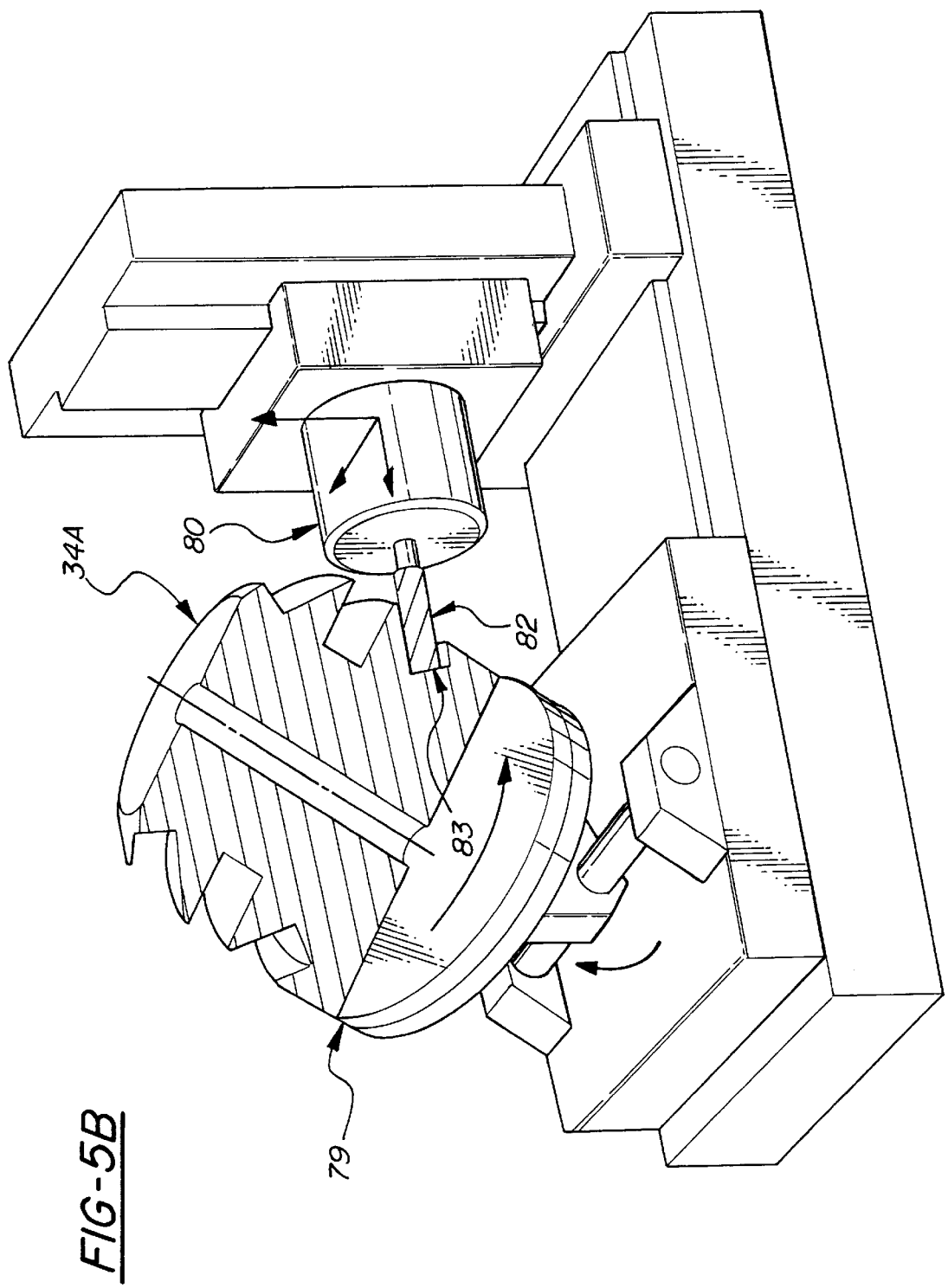

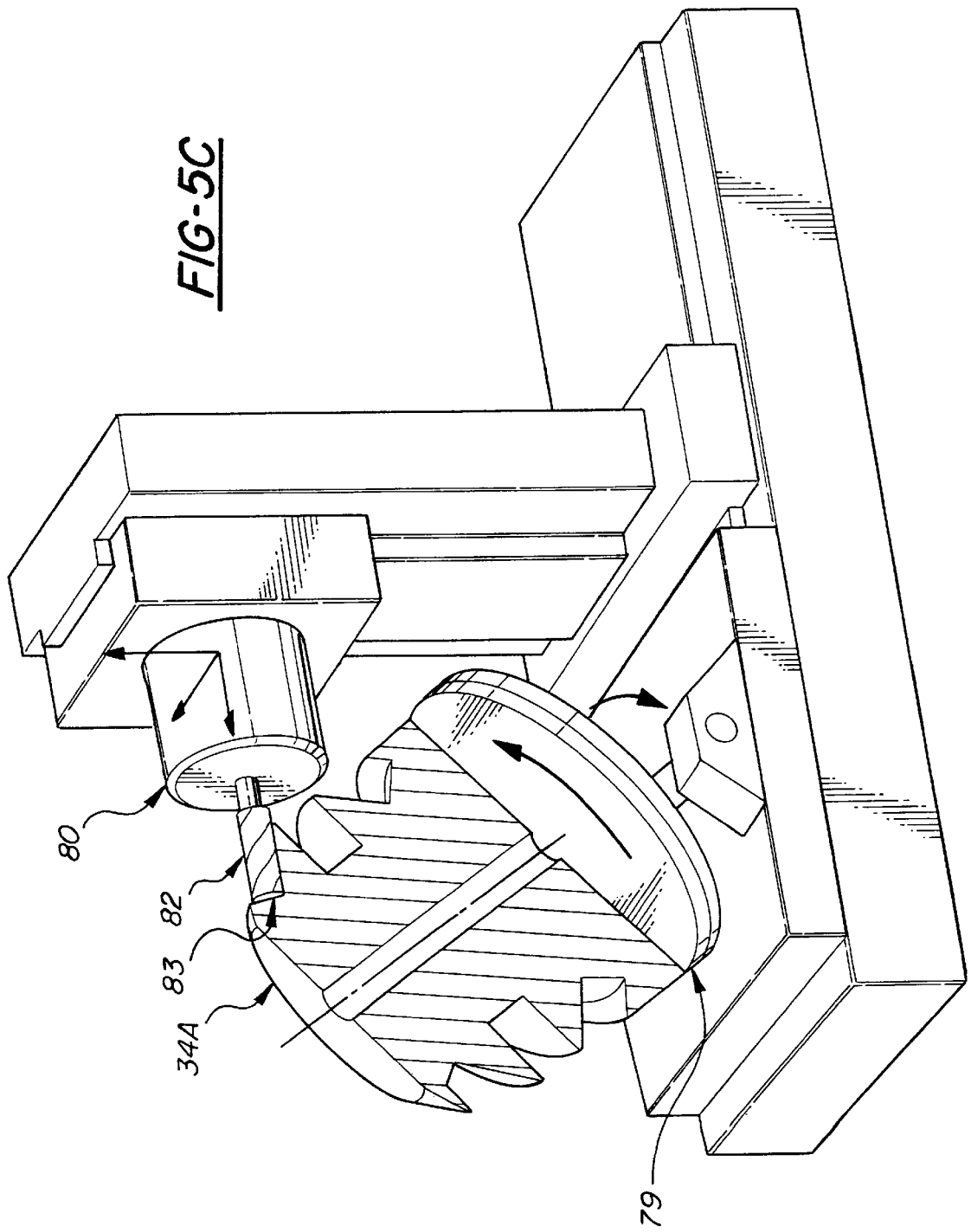

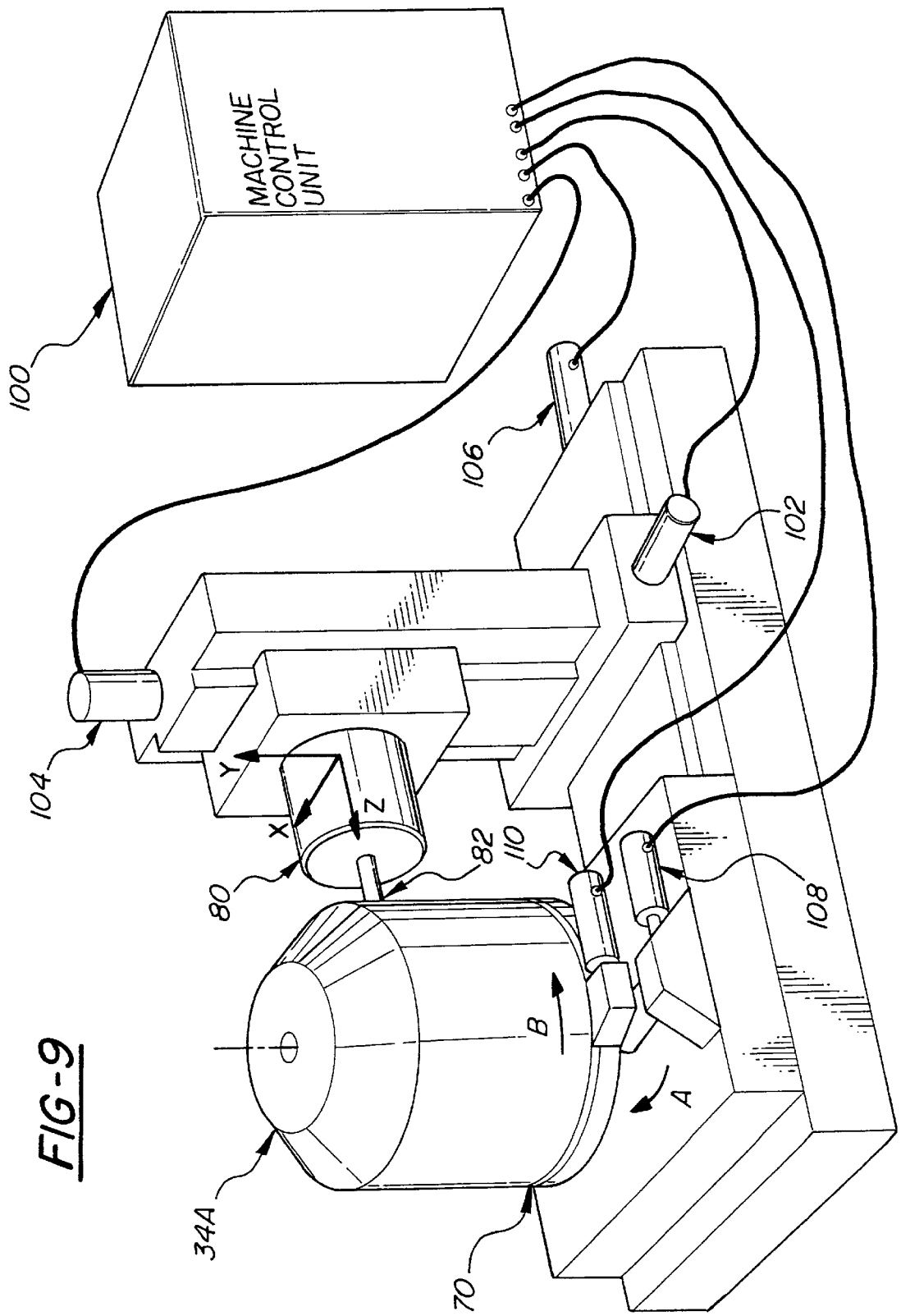

METHOD FOR MANUFACTURING FLUID COMPRESSION/COMPRESSOR ROTOR

This application is a continuation-in-part of application Ser. No. 09/074,976, abandoned filed May 8, 1998, a division of application Ser. No. 08/738,087, filed Oct. 25, 1996, now U.S. Pat. No. 5,782,624, which is based on Provisional application Ser. No. 60/007,153 filed Nov. 1, 1995.

FIELD OF THE INVENTION

This invention relates to rotary fluid machines, and more particularly, to single screw fluid compressors and expanders featuring new and improved main rotor flute and gate rotor tooth designs and further to a new and improved method of manufacturing main rotor flutes.

BACKGROUND OF THE INVENTION

Fluid machines such as fluid compressors or expanders of the single screw type, also known as monoscrew or globoid types, are well known in the art. The single screw of such machines comprises one main rotor usually working with a pair of gate rotors. The main rotor typically has six helical-like flutes each with a globoid or hourglass root profile. The gate rotors each typically have a plurality of radially spaced gating teeth and are located on opposite sides of the main rotor and mesh with the flutes. When the main rotor is rotatably driven, the meshing side rotors are driven thereby and cooperate therewith to displace the fluid fed into the rotor flutes while changing the volume thereof. In the case of compressors having such main and gate rotors in air conditioning or refrigeration systems, the vaporized refrigerant is compressed and transmitted as a high temperature and high-pressure vapor to the condenser.

PRIOR ART

Most present single screw compressor designs use a circular arc for the tips of the gate rotor teeth, which requires that the mating root of the flute in the main rotor be concavely curved. Representative examples of such designs are disclosed in U.S. Pat. Nos. 4,179,250, issued Dec. 18, 1979, and 4,036,567, issued Jul. 19, 1977, in which the gate rotor tooth tips and matching main rotor roots of the fluid conducting flutes therein are oppositely curved so that they mate together for fluid sealing purposes.

As noted in prior U.S. Pat. No. 3,133,695, issued May 19, 1964, the forming of the threads of the main rotor of prior compressors involves complex manufacturing problems. Among the drawbacks of such prior designs is that the double curvature of the roots of the helical-like flutes of the single screw or main rotor makes them difficult to manufacture with the desired minimal clearance necessary for effective fluid sealing with the gate rotor tips throughout their sweep of the main rotor flutes. Such tight tolerance sealing was obtained with laborious and demanding manufacturing procedures. Prior designs accordingly were limited in application particularly where quantity production is needed.

More particularly, the manufacture of compressors with such prior art main rotor flute designs is expensive primarily because of the high cost of the many required passes of a cutting tool along the surfaces of a blank or starting part and then precision hand finishing and/or lapping of the root surfaces until a suitable rotor is produced.

Examples of this type of prior art are disclosed in U.S. Pat. Nos. 3,875,635 issued Apr. 8, 1975; 3,932,077 issued Jan. 13, 1976; 4,596,501 issued Jun. 24, 1986; 4,775,270 issued Oct. 4, 1988; and 4,565,474 issued Jan. 21, 1986.

U.S. Pat. Nos. '501 and '270 teach the machining of the flanks of impeller blades. However, they do not teach about the root surfaces between the blades or the manufacture of those surfaces. Also, since the flanks of impeller blades do not seal with an intermeshing surface, sealing tolerances are not required either on the flanks or the roots between the blades of the impeller. The methods taught inherently leave cusps or ridges in the roots surfaces and not ruled surface roots.

U.S. Pat. Nos. '635 and '474 teach the machining of the faces of gear teeth. However, they do not teach about the root surface between the teeth or the manufacture of those surfaces. Also, since the roots between the teeth of a gear are designed to remain at a distance from the tips of the teeth of the mating gear, close tolerances and ruled surfaces are not required nor addressed. The methods taught inherently leave ridges in the root surface of the gear and not ruled surface roots.

U.S. Pat. No. '077 teaches the milling of the side or flank surfaces of the flutes of a main rotor of a single screw compressor. However, this patent does not teach about the root surface between the sides of the flute or providing any ruled root surfaces.

Also, special machines that use special cutting tools that mimic the shape of the gate rotor geometry and the combined motions of the main and gate rotors are often employed. These highly specialized and expensive machine tools must make many passes, as the flutes are cut with a small incremental removal of material from the starting blank with each pass. Even after such special machining the finishing of the flutes requires laborious and costly polishing and/or lapping.

Examples of this type of prior art are disclosed in U.S. Pat. Nos. 4,222,691 issued Sep. 16, 1980; 4,342,548 issued Aug. 3, 1982; 5,084,965 issued Feb. 4, 1992; and 5,598,618 issued Feb. 4, 1997.

U.S. Pat. Nos. '691 and '548 teach a method for machining the flutes of a main rotor of a single screw compressor that has angular sides or flanks by employing a straight sided cutter rather than an angular side cutter. This method requires an expensive and highly specialized machine and many passes of the cutter. Also, because of the geometry of the cutter and the motion of the machine, this method can only be used to machine main rotors that mate with cylindrical gate rotors. To machine a main rotor that mates with a planar gate rotor requires a different type of machine and cutter.

U.S. Pat. No. '965 teaches a method for machining the flutes of a main rotor of a single screw compressor that has straight sides or flanks by employing a cutter that feeds out from a central axis. This method requires an expensive and highly specialized machine and many passes of the cutter.

U.S. Pat. No. '618 teaches a method for machining the flutes of a main rotor of single screw compressor by employing special cutters that are driven by an expensive and highly specialized machine tool and requires many passes of the cutter.

U.S. Pat. No. 3,945,778, issued Mar. 23, 1976, discloses another prior art main rotor design with flutes having slanted or inclined rectilinear roots mating with the slanted tips of the gate rotor teeth. Such slanted root designs still cannot be efficiently or effectively manufactured particularly with a few passes of an end mill. Such complex slanted roots, especially those involving an acute angle between the flanks and roots of the flutes, involve manufacturing by the same multi-pass procedures involved in making the other prior art main rotors referenced above, or may even require more complex processes.

SUMMARY OF THE INVENTION

The present invention is drawn to rotary screw compressors and expanders in which a main rotor has a plurality of discrete arcked-helical flutes machined or otherwise formed therein. Each of the flutes features spaced flanking sides and a root with a moving straight line fluid sealing area, which is generally perpendicular to the flanking sides, for cooperative sealing with the predominantly flat tips of the cooperative gate rotor teeth. Each of these roots may be described as a ruled surface, which is a straight line segment moved through space along a predetermined path, in this case in an arcked-helical path through the material of the main rotor with respect to its longitudinal axis.

Preferably, such flutes of the rotor of this invention are economically and efficiently end milled into a rotor blank or pre-formed part. In one featured procedure each flute is end milled in two passes with a first pass forming one side or flank of a flute and a portion of the ruled surface root and a second pass forming the other side or flank of the flute and the remaining portion of the ruled surface root. In another featured procedure the sides of each flute are end milled in separate passes while the ruled surface root is milled in a third pass to complete the flute.

In all cases, a commercially available, flat bottomed end mill may be employed which is capable of cutting on its side and end surfaces simultaneously. This end mill machines the side surfaces of the flute and the ruled surface root between the sides of the flute to the required size, shape, and sealing tolerance without subsequent machining operations, hand finishing, and/or lapping. This is accomplished by keeping the axis of the flat bottomed end mill perpendicular to the ruling of the root surface, and at all times throughout the milling process.

Maintaining this end mill orientation to the flute surfaces is achieved by having the milling machine controlled to move all five of its axes, two rotary axes and there linear axes, simultaneously in a coordinated motion. This type of machine tool is commercially available from many machine tool builders, and since it is a standard product it can be procured at a lower cost than a specialized machine tool designed for a specific task, as is required in the prior art.

In any event, with the roots of the flutes being ruled surfaces, having an infinite number of continuous straight-lined rulings or sealing areas that match and cooperate with the predominantly straight-line tips of the gate rotor teeth, fluid sealing between the main and gate rotors is enhanced to improve the operation of the rotary fluid machine.

Another feature and object of the present invention is to provide a single screw rotary fluid machine for varying the volume of a fluid medium supplied thereto that incorporates a new and improved high tolerance fluid seal between the cooperating rotors thereof which is easily and economically manufactured.

An additional feature and object of the invention is to provide a new and improved rotary fluid machine that includes a main drive rotor with a plurality of discrete arcked-helical flutes that have ruled root surfaces and an associated gate rotor having teeth which mesh with the flutes and which terminate in tips that are predominantly planar and co-act with the ruled root surface to provide predominantly planar moving regions of high tolerance fluid sealing when the rotors turn to move fluid through the machine.

A further feature and object of the present invention is to provide a new and improved fluid machine with a main rotor having arcked-helical flutes having roots that have an infinite number of straight-line sealing segments between the flanks of the flutes which are predominantly perpendicular to the axis of the incoming straight tipped teeth of an associated gate rotor such that the flutes in the main rotor can be milled at a single station with a limited number of passes of an end milling machine.

Another feature and object of this invention is to provide a new and improved and economical method of making a fluted main rotor for a rotary fluid machine that has at least one gate rotor with similar radial gating teeth that have predominantly flat straight-line tips. The starting part for the main rotor is milled so that the roots of the flutes have an infinite number of straight line fluid sealing segments that cooperate with the straight-line tips of the gating teeth sweeping therethrough to provide substantially straight line fluid sealing in the rotary machine.

In one preferred method the starting blank or preformed part is milled in a first pass to form an arcked-helical flank and associated arcked-helical portion of the ruled surface root of a first flute. Subsequently, an opposing arcked-helical side flank and a further portion of said arcked-helical ruled surface root is milled in the starting part to form a first flute with a ruled surface root having straight-line fluid sealing for the flat tips of the gate rotor teeth. The straight-line sealing is in the plane of the gate rotor. In a similar manner additional flutes are milled into the starting part until the main rotor is completed.

A further milling method in another preferred embodiment allows the first two passes to mill mainly the side flanks with the ruled surface root subsequently being primarily milled in a third pass.

Further features, objects and advantages of the present invention become more apparent from the following description and drawings.

BRIEF DESCRIPTION OF THE DRAWINGS

FIGS. 5A, 5B and 5C are pictorial views of a longitudinal section of the main rotor of FIGS. 2 through 4 being milled by an end mill on a 5 axis milling machine;

FIG. 9 is a schematic view of the 5 axis milling machine, the controller to coordinate the movement of the machine axes, the end mill cutting tool, and the main rotor.

DETAILED DESCRIPTION OF THE DRAWINGS

Figure 1:
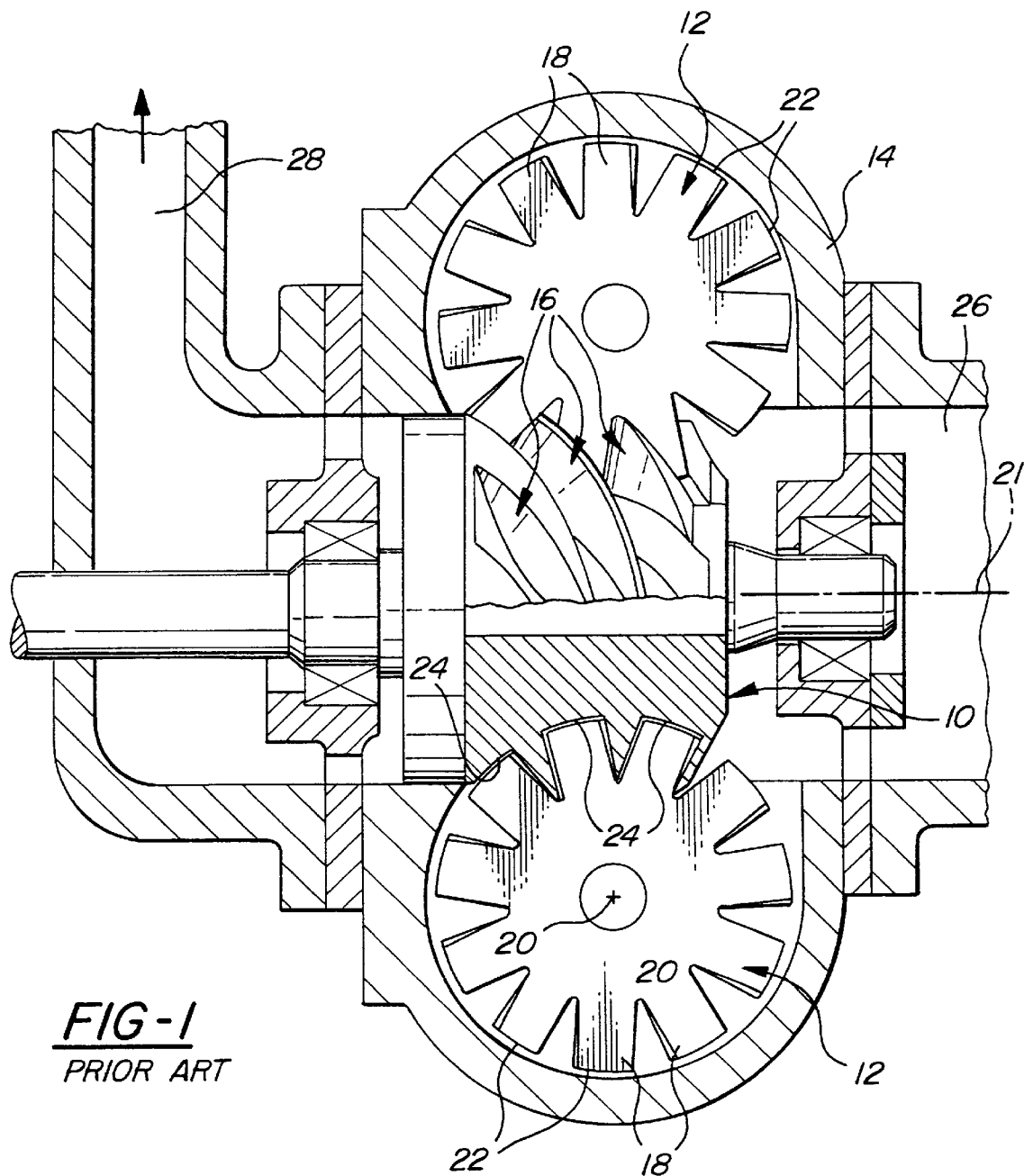
FIG. 1 is a top view, partly in section, of a prior art single screw compressor.

The general arrangement of one prior art single screw compressor often referenced as a "Globoid worm" type is shown in FIG. 1. This compressor includes a main rotor 10 and a pair of gate rotors 12 operatively mounted in housing 14. The main rotor has flutes 16 formed in the body thereof, which mesh with the teeth 18 of the gate rotors 12 that extend radially outward from their rotational axes 20 on opposite sides of the rotational axis 21 of the main rotor. The gate rotor teeth 18 have rounded or circular tips 22 that mate with the oppositely curved roots 24 of the flutes of the main rotor 10 extending between the flanks or sides of the flutes 16.

The general function of the compressor is to compress fluid that is fed into the chambers defined by the flutes and meshing gate rotor teeth. The fluid enters through an inlet generally indicated at 26 and exits through a discharge generally indicated at 28. As the gate rotor teeth 18 sweep through the flutes 16, a moving fluid seal is formed therebetween and the fluid in the chambers is compressed and forced into the outlet 28.

Figure 2:
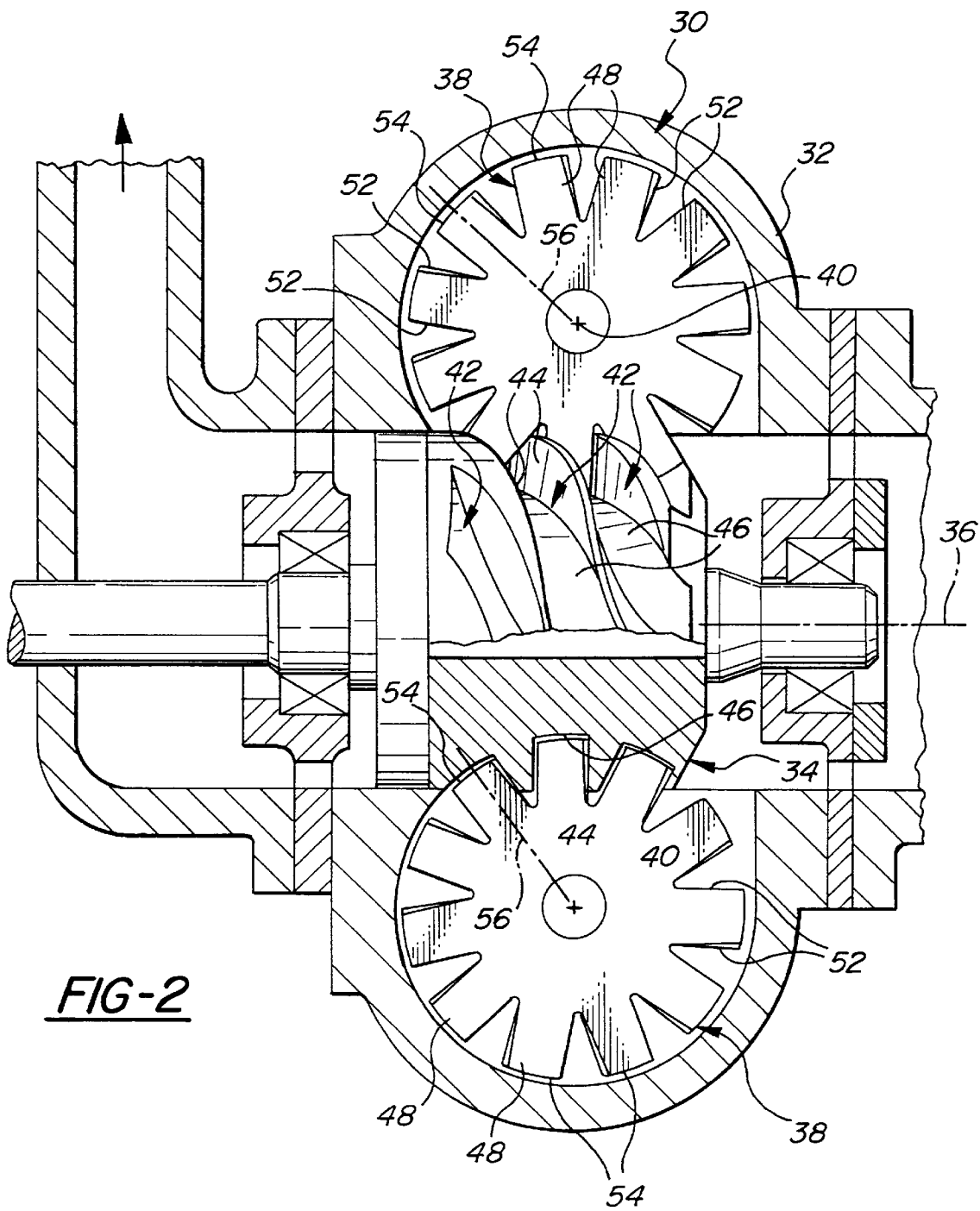
FIG. 2 is a top view, partly in section, of a single screw compressor embodying this invention.
Figure 3:
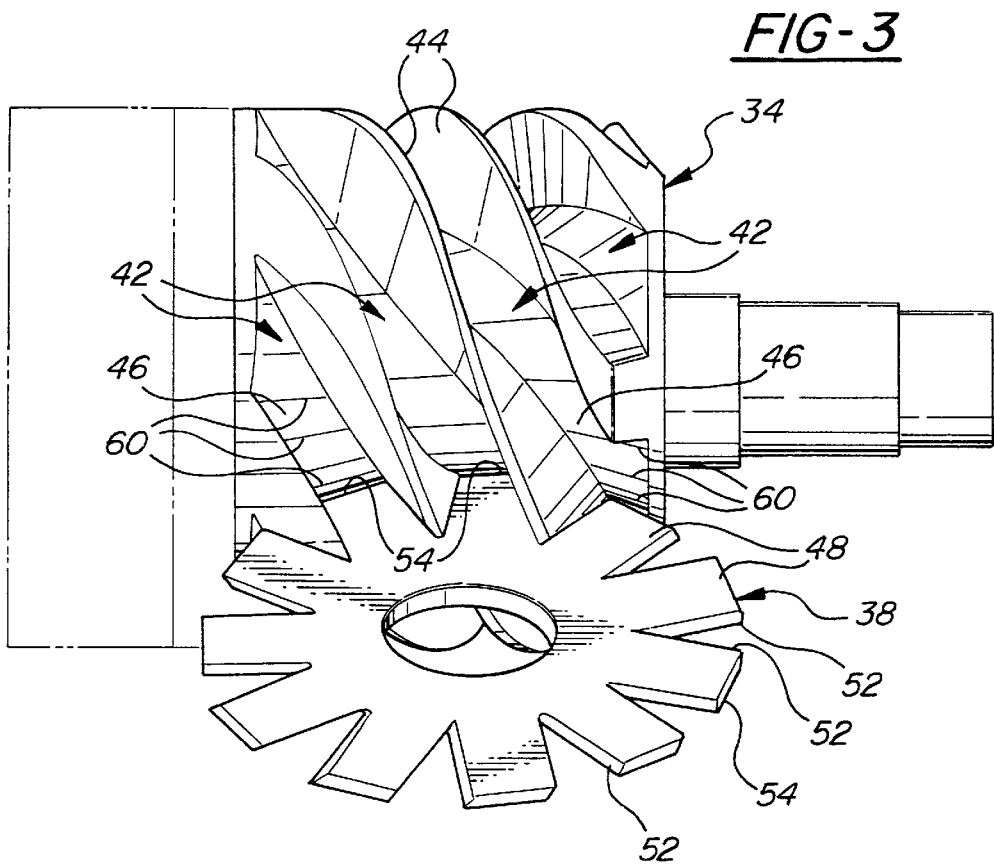
FIG. 3 is a pictorial view of several rotor components of the compressor of FIG. 2.
Figure 4:
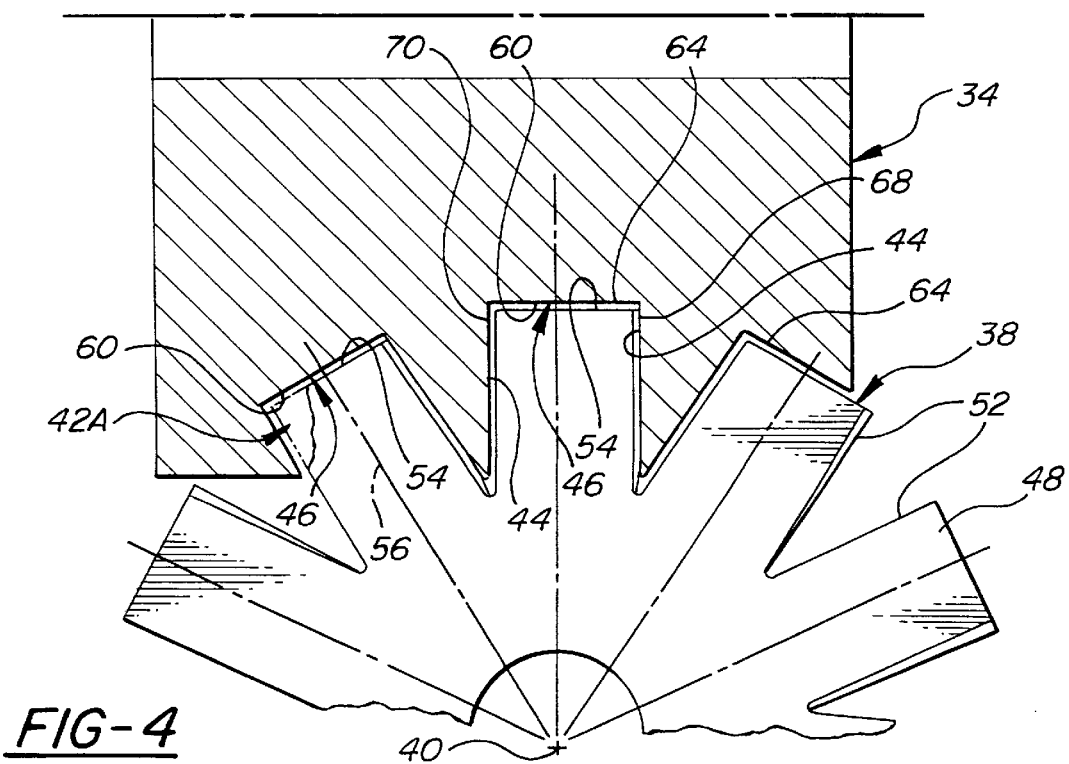
FIG. 4 is a diagrammatic view of this invention with parts broken away illustrating the intermeshing of a portion of the gate rotor teeth with flutes of the main rotor.

One preferred embodiment of the present invention shown in FIGS. 2 through 4 is of the general category of the prior art referenced above. This embodiment comprises a compressor 30 having a housing 32 in which a main rotor 34 rotatable around a first axis 36 and a pair of gate rotors 38, operatively meshing with the main rotor for rotation around second axes 40, are operatively mounted.

Each of the second axes 40 of the gate rotors 38 is preferably perpendicular to the first axis 36 of the main rotor 34. However, the second axes 40 can be oriented in any way such that they are not perpendicular to the first axis 36 yet still be transverse to the first axis. Accordingly, transverse as far as the main and gate rotor axes are concerned is defined as any axes that are non-parallel. The main rotor 34 has a plurality of discrete flutes 42 milled or otherwise formed in the body thereof. Each of the flutes 42 is defined by two flanking sides 44 and a ruled surface root 46 extending therebetween.

The gate rotors 38 have uniformly spaced teeth 48 that extend radially outward from the axes of rotation 40 and have side edges 52, which match the flanking sides 44 of the flutes 42. More importantly the teeth 48 terminate in predominantly flat or straight-line tips 54 which match the infinite number of ruling lines defining the straight line sealing segments 60 of the roots 46 of the flutes when in their operative intermeshing positions. The tips 54 are generally perpendicular to the longitudinal axes of the teeth thereof defined by radial lines 56 from the rotational center of the gate rotor.

The root 46 of each flute is the surface formed by an infinite number of ruling lines or straight line segments 60 that in effect represents the positions of the predominantly planar tips of the gate rotor teeth 48, as they fit into the flutes and move along an arcked-helical path through the main rotor 34. This type of surface is mathematically known as a ruled surface, which may be defined as a straight ruling line moving through space along a predetermined path.

The descriptive term arcked-helical used in this specification to generally describe and explain the unique geometry of the flutes 42 is defined as follows:

If the gate rotor teeth were to follow a linear path in their plane of rotation, that is, if the gate rotor 38 were of infinite radius, the result would be a helical path through the body of the rotating main rotor 34. However, since the gate rotor teeth 48 follow a circular path of a finite radius in their plane of rotation, the path through the main rotor 34 becomes modified by the circular motion of the gate rotor 38. This modified path resulting from the combined rotary motions of the main and gate rotors is a helix with an arc and is accordingly described as "arcked-helical". The arc of this modified path as shown in FIG. 4 has a center point corresponding to the rotational axis 40. The root 46 of a first flute 42A is formed by the ruling line 60 sweeping through its arcked-helical path while remaining generally perpendicular to the radial line 56 extending through the center point or rotational axis 40. As shown, the other flutes are similarly formed.

It will be appreciated that the ruled surface roots 46 of the arcked-helical flutes 42 are engineered to have an infinite or continuous number of straight lined sealing surfaces or segments 60 for matching and close cooperation with the substantially flat tips of the gate rotor teeth extending across the roots 46 to improve the fluid sealing between the gate rotor teeth and the flutes of the main rotor and to provide a design for improving the manufacture of the rotors as is further discussed below.

On mutual rotation of the rotors, the teeth 48 of the gate rotors 38 intermesh with the main rotor flutes 42 and, as best shown in FIG. 4, create fluid seals between the three mating surfaces of the gate rotor teeth 48 and the main rotor flutes 42. More particularly, the predominantly flat tips 54 of the gate rotor teeth extend across and closely approach contact with the ruled surface of the roots 46 throughout their sweep of the flutes to form linear sealing areas 64. Since the surface of the roots 46 is ruled as described above, as the flat tip of an associated gate rotor tooth passes over the infinity of straight line sealing segments 60 of the root, a predominantly flat sealing section or area 64 is continuously formed therebetween.

The paths of the discrete flutes 42 extending in the main rotor 34 are in the described arcked-helical configuration. The ruled surface roots 46 of each of the flutes 42 are milled such that at any longitudinal section of the main rotor in the plane of the gate rotor 38, the root 46 will show a predominantly straight line profile and form the straight line segments 60 to provide the effective sealing areas 64 with the predominantly flat tips 54 of the gate rotor teeth.

Further, the straight line sealing segments 60, or the ruled surface, of the roots 46 are substantially perpendicular to the two flanks or sides 68, 70 of the flutes 42 as best shown in FIG. 4. Also, the sealing segments 60 of the roots 46 are predominantly perpendicular to the longitudinal axes or centerlines 56 of the mating gate rotor teeth 48. This mating of the gate rotor tooth tips and the surfaces of the root provide improved sealing since their straight line configurations can be readily held at close tolerance and the sealing areas 64 are substantially constant throughout the tooth sweep.

The main rotor 34 having arcked-helical flutes 42 and ruled surface roots 46 may be manufactured in the preferred processes employing an end mill. FIGS. 5A, 5B, 5c and 9 diagrammatically illustrate milling equipment including an end mill 82, which can be moved in the x,y and z axes by actuator motors 102, 104 and 106 controlled by a programmed machine control unit 100. The milling equipment further includes a table on workstation 79, which can be turned around axis of rotation B. When driven by actuator motor 110. The table workstation 79 can also be tilted about axis A driven by actuator motor 108. Operation of the motors 108 and 110 to turn and tilt table 79 in a milling operation are controlled by machining control unit 100 programmed to run the milling operation simultaneously in all five axes to mill the rotor.

As shown in FIGS. 5 through 8, a blank or pre-processed main rotor 34A of a metal, engineered material or other suitable material is placed as a starting part on the tilt table and rotatable workstation 79 associated with the milling machine 80. Machine 80 has a powered rotatable milling tool 82 with a flat milling end 83. The milling machine 80 is powered and moved along appropriate x, y and z axes of motion as the workstation 79 is turned and tilted, illustrated in FIGS. 5A, 5B and 5C, so that the rotating milling tool resultantly makes a first milling pass 84 in a predetermined path into the material of the blank or pre-processed rotor 34A to mill one arcked-helical side flank 44 and at least one half 46A of the root of a first flute. The first pass is shown in FIG. 6A. In making the first and other passes, the ruled surface of the root is formed by the flat bottom of the end mill.

It is to be noted, that by using a flat bottomed end mill and by keeping it perpendicular to the ruled surface root and tangent to the sides of the flute throughout the milling process it is possible to simultaneously machine both the sides of the flute and the ruled surface root to their finished size, shape, and sealing tolerance. Therefore, no further machine operations, hand finishing, or lapping is required.

Figure 6A:
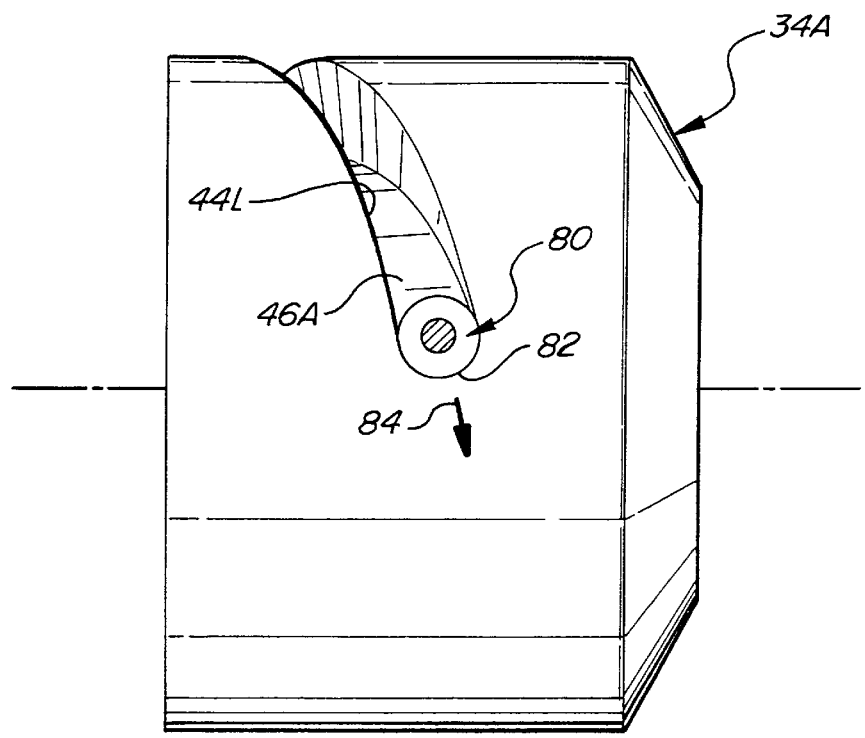
FIGS. 6A and 6B are pictorial views illustrating the manufacture of the main rotor of FIGS. 2 though 4 with an end mill.
Figure 6B:
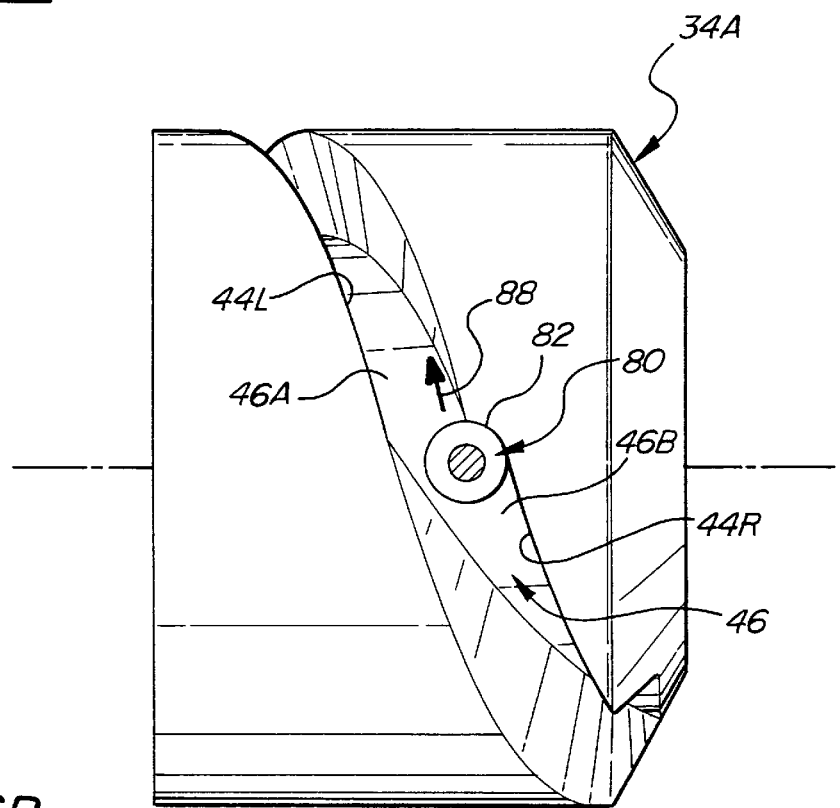

Subsequently, a second milling pass 88, such as shown in FIG. 6B, is made to mill the other side flank 44 and another portion of the root 46B. Accordingly, one flute with a ruled surface root 46 may be made to its finished size, shape, and sealing tolerance with two milling passes. Following this procedure, subsequent passes of the milling machine are made to mill the remaining flutes 42 into the blank or pre-processed main rotor 34A to complete the main rotor.

Figure 7:
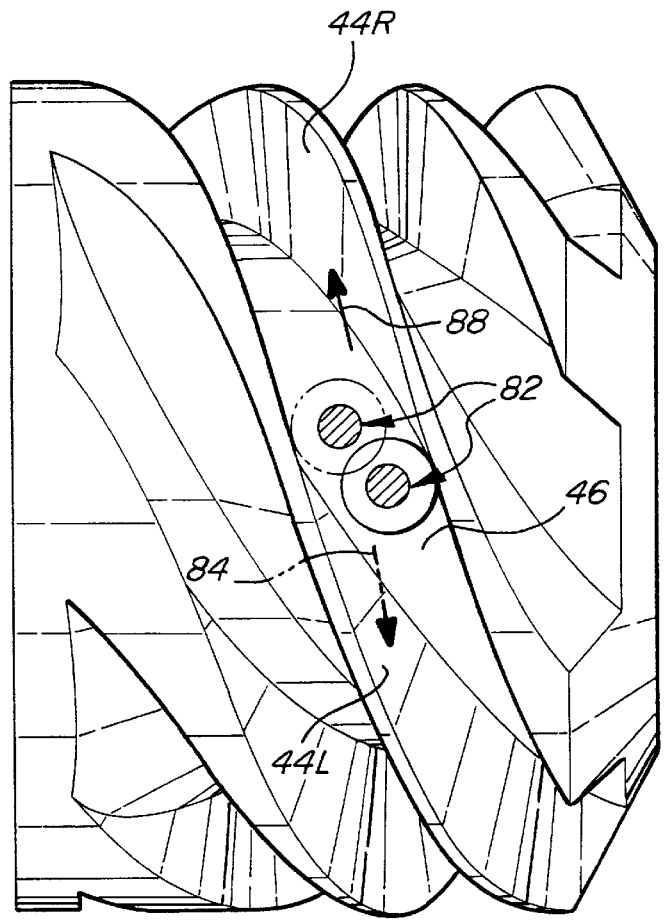
FIG. 7 is a pictorial view of the main rotor with a representation of the paths of the end mill tool during manufacture.

The paths 84, 88 of the milling tool 82 are shown more specifically in FIG. 7. The first tooling path 84 mills left flank 44L and a portion of the ruled surface root 46. The second tooling path 88 mills the right flank 44R and another portion of the ruled surface root 46. The tooling paths of the milling tool 82 are preferably in opposite directions as illustrated so as to create a consistent cutting condition. However, milling with the same directional paths is possible.

In any event, no further machine operations, hand finishing, or lapping are required to finish the ruled surface roots or the sides of the flutes to a finished size, shape, and sealing tolerances.

Figure 8:
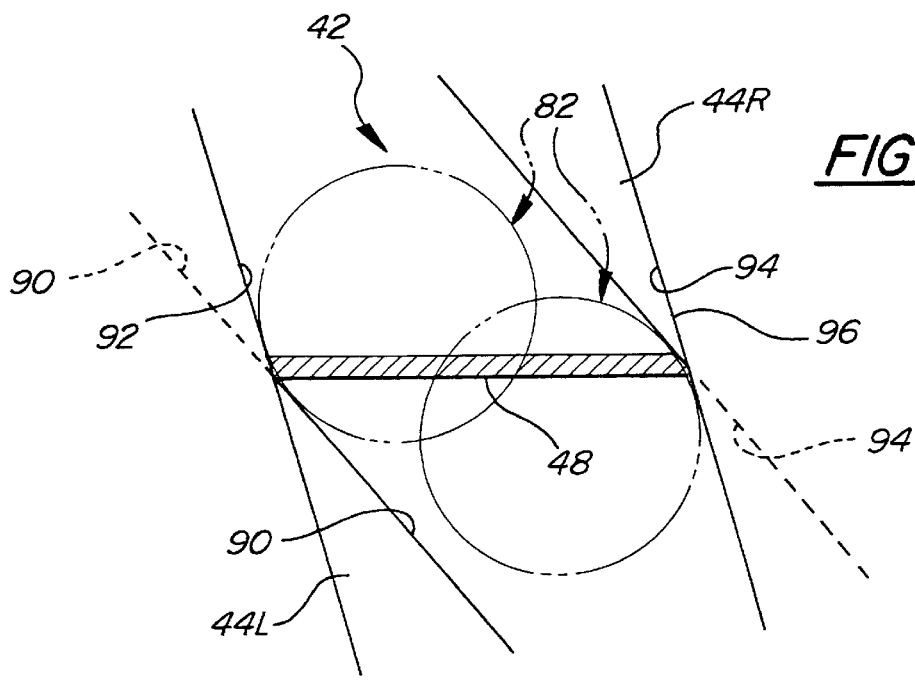
FIG. 8 is a diagrammatic view of the end mill tool paths within the flute of the main rotor for accommodating a flat tipped gate rotor tooth.

The paths of the milling tool 82 in milling a main rotor flute 42 are shown in FIG. 8. A left lower edge line 90 and a left top edge line 92 are the left-most boundaries of the flute 42. Together these two edge lines define the inner and outer limits of the left flank of the flute 42. A right lower edge line 94 and a right top edge line 96 are the right-most boundaries of the flute 42. Together these two edge lines define the inner and outer limits of the right flank of the flute 42. A gate rotor tooth 48 is shown, as it would fit within the sides or flanks of the flute 42 at any single instant in time. This tooth is shown for reference purposes since it is not present during milling.

In a first milling tool path the rotating tool mills the left flank and a portion of the ruled surface root. At any single moment during the first milling path the end milling tool is perpendicular to the ruled surface root and tangent to the left upper edge and the left lower edge lines. This allows the milling tool to create a left flank that is substantially perpendicular to the straight-line segments 60 and provides a precision sealing surface with the sides of the gate rotor teeth.

In a second milling tool path the tool mills the right flank and another portion of the ruled surface root. Preferably, the ruled surface root is completed with the two passes although the root may be completely milled in a third pass. As with the first milling tool path, the second milling pass at any single moment is perpendicular to the ruled surface root and tangent to the right upper edge and the right lower edge lines. This allows the milling tool to create a right flank that is substantially perpendicular to the straight line rulings, or segments 60, of the root to provide the precision sealing surface with the tip and sides of the gate rotor tooth.

While preferred embodiments and manufacturing methods of the invention have been shown and described, other embodiments will now become apparent to those skilled in the art. Accordingly, this invention is not to be limited to that which is shown and described but by the following claims.

What is claimed is:

1. A method of making a main rotor with at least one fluid conducting flute therein having opposing side flanks and a ruled surface root therebetween, where the ruled surface root comprises a plurality of straight line sealing segments, the main rotor being for use in a rotary fluid machine having a gate rotor cooperating therewith to force volumes of fluid therethrough, where the gate rotor has a plurality of teeth having straight line tips that form straight line sealing areas with the ruled surface root when the gate rotor is engaged with the main rotor, said method comprising the steps of:
    a. providing a starting unit composed of a material for said main rotor of a predetermined configuration,
    b. positioning the starting unit at a work area of a milling machine,
    c. operating the milling machine to:
        (1) make a first milling pass into the material of said starting unit to mill one side flank and one portion of the ruled surface root of a first flute extending into the material of the starting unit,
        (2) make a second milling pass into the material of said starting unit to mill the opposite side flank and another portion of the ruled surface root of said first flute thus completing the first flute.

2. A method of making a main rotor with fluid conducting flutes each with opposing side flanks and a ruled surface root therebetween for a rotary fluid machine having a gate rotor with a plurality of teeth with straight line tips which are formed to operatively fit into said flutes to define fully straight line sealing areas between said tips and said ruled surface root and to operatively cooperate therewith to force volumes of fluid therethrough comprising the steps of:
    a. providing a starting unit composed of a material for said main rotor of a predetermined configuration having a centralized axis,
    b. providing the starting unit at a work area of a milling machine for rotating the starting unit about said centralized axis, the milling machine having a rotatable milling tool to mill the side flanks of said flutes and formed with an end for milling the ruled surface roots of said flutes,
    c. operating the milling machine and rotatably powering the milling to:
        (1) make a first milling pass into the material of said starting unit to mill one side flank of a first flute of the starting unit and simultaneously mill a portion of said ruled surface root of said first flute,
        (2) make a second milling pass into the material of said starting unit to mill the opposite side flank of said first flute which faces the previously milled side flank of the first flute and simultaneously mill another portion of said ruled surface root of said first flute,
        (3) make a third milling pass into the material of said starting unit between said flanks to mill and complete the ruled surface root through the material of said starting unit between said side flanks of said first flute, d. continuing operation of said milling machine to mill additional flutes with ruled surface roots in said starting unit until a plurality of flutes with ruled surface roots have been milled into said unit to complete the main rotor for operatively receiving said teeth of an associated gate rotor.

3. A method of making a main rotor with a plurality of helically-arced fluid conducting flutes each with opposing side flanks and a ruled surface root therebetween for a rotary fluid machine having an associated gate rotor with a plurality of teeth with flat tips which are adapted to operatively fit into said flutes to define straight line sealing areas between said tips and said ruled surface root for varying the volume of a fluid supplied thereto as the teeth sweep therethrough comprising the steps of:

a. providing a starting unit composed of a material of a predetermined configuration having a centralized axis, b. positioning the starting unit at a work area of a milling machine for rotation about said centralized axis, the milling machine having a rotatable end milling tool with a milling end, c. operating said milling machine to:
(1) make a first milling pass into the material of said unit to mill one side flank and one portion of the ruled surface root of a first helically-arced flute,
(2) make a second milling pass into the material of said unit to mill the opposite side flank and another portion of the ruled surface root of said first helically-arced flute to substantially complete the milling of said first flute, d. continuing operating of said milling machine to mill additional flutes in said unit in the manner that said first flute was milled until a plurality of discrete flutes with ruled surface roots have been milled into said unit which are spaced from one another to complete said main rotor, and e. removing the milled unit from said work area.

4. The method of claim 3, wherein said starting unit is a blank and said milling passes completely form and finish the flutes with ruled surface roots therein.

5. The method of claim 3, wherein said starting unit is a pre-shaped part with pre-shaped flutes therein, and wherein said milling passes finish the flutes with ruled surface roots therein.

6. A method of making flutes with opposing side flanks and with ruled surface roots defining straight line sealing segments therebetween in a main rotor for a rotary fluid machine, said ruled surface roots meshing with flat-tipped teeth of a gate rotor to form straight line sealing areas between said tips and said ruled surface roots, said main rotor and said gate rotor cooperatively forming operative components of the rotary machine for displacing a fluid medium supplied thereto comprising the steps of:

a. providing a starting unit composed of a material of a predetermined configuration and having a centralized axis, b. positioning the starting unit at a work area of an end milling machine having a rotatable milling tool to mill the side flanks of said flutes and said milling tool formed with a milling end for milling the ruled surface roots of said flutes, c. activating the end milling machine to mill in one pass the opposing side flanks of a first flute and to simultaneously mill the associated ruled surface root to complete the first flute with spaced flanks and the associated ruled surface root, which associated ruled surface root follows a first helically-arced path about said centralized axis, d. continuing the activation of the end milling machine to make additional flutes with ruled surface roots in said unit using additional milling operations with the steps used to make the first flute until a predetermined number of flutes have been made to complete formation of said main rotor, and e. removing the completed main rotor from said work area.

7. A method of making a plurality of discrete helically-arced fluid conducting flutes, each flute having opposing side walls and a ruled surface root, in a main rotor for a rotary fluid machine having a gate rotor with teeth having flat tips that fit into said flutes to form generally straight line fluid seals with the ruled surface roots of the flutes comprising the steps of:

a. providing a starting unit of a predetermined configuration having a central axis, b. positioning the starting unit at a work area of a milling machine for rotation about said centralized axis, the milling machine having a rotatable end mill with a milling end, c. powering said end mill to mill a first ruled surface root, and d. making passes into the starting unit to form a plurality of flutes each with said opposing side walls and said ruled root surface, where said ruled root surface is generally perpendicular to the side walls made by said milling passes and follows a helically-arced path in the starting unit and cooperates with said tips to form said generally straight line fluid seals therebetween.

8. The method of claim 7 wherein said milling machine is a five-axis milling machine for tilting and rotating said starting unit about an axis that is different from the central axis of the starting unit for milling said ruled root surfaces of said flutes.

* * * * *